Figure 1:
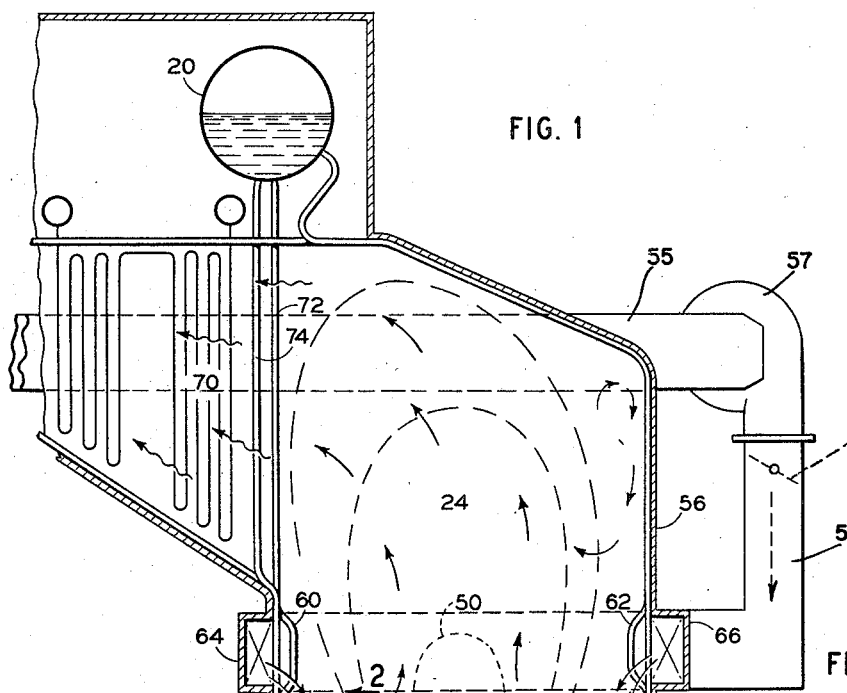

Sept. 22, 1959   P. R. GROSSMAN   2,905,155
GAS RECIRCULATION METHOD FOR CONTROLLING SUPERHEAT
IN A SLAG TAP VAPOR GENERATING AND SUPERHEATING
UNIT AND APPARATUS THEREFOR
Filed Dec. 22, 1954

*INVENTOR.*
PAUL R. GROSSMAN
BY

United States Patent Office 2,905,155
Patented Sept. 22, 1959

2,905,155

GAS RECIRCULATION METHOD FOR CONTROLLING SUPERHEAT IN A SLAG TAP VAPOR GENERATING AND SUPERHEATING UNIT AND APPARATUS THEREFOR

Paul R. Grossman, Alliance, Ohio, assignor to The Babcock & Wilcox Company, New York, N.Y., a corporation of New Jersey Application December 22, 1954, Serial No. 476,894

9 Claims. (Cl. 122—478)

This invention relates to methods of effecting the heating of fluids in the confined streams bordering a heating zone into which pass combustion gases with particles of fused incombustible matter. The gases with their suspended particles flow from a combustion zone fired by a slag forming fuel at temperatures above the fusion temperature of the incombustible in the fuel.

The invention is more particularly concerned with the above described method when the confined streams of liquid receive heat from the combustion gases for the generation of a vapor under high pressure, and for the superheating of the generated vapor by convection heat transfer from the gases after the suspended solid particles have had their condition so changed that they are not in a sticky condition.

In a more particular sense, the above indicated method of the invention involves the burning of a slag forming fuel in a high temperature zone at temperatures above the fusion temperature of the incombustible in the fuel, the radiant transfer of heat from the combustion products to confined streams of a vaporizable fluid defining or bounding the high temperature combustion zone, the reduction of the temperature of the particles of fused incombustible suspended in the combustion gases by the further transfer of heat therefrom to confined streams bounding a secondary zone, the said reduction in temperature being eeffcted by the introduction into the secondary zone of the lower temperature combustion gases in such a manner that the lower temperature gases enter the secondary zone in regions interposed between the heat receptive confined fluid streams and the flow of high temperature combustion gases with their suspended particles of fused incombustible. With this action the zones of meeting and mixing of the lower temeprature gases with the higher temperature gases with their suspended solids are so spaced from the positions of the confined liquid streams that the suspended solids are changed from a fused or sticky condition to a non-sticky condition so that, when such particles do contact the tubes, they do not excessively accumulate on the tubes and thereby interfere with the heat transfer from the gases to the confined fluid streams.

The invention, in a more particular sense, involves the above described method in conjunction with a recirculated gas control of the superheat temperature of the generated vapor at the outlet of the convection superheating zone so that a predetermined vapor superheat temperature may be maintained over a wide range of vapor generation rates.

Still more specifically, the above described method involves the burning of fuel in such a manner that the high temperature combustion gases are restricted in their flow to a high velocity jet flow from the high temperature combustion zone, and the recirculated lower temperature combustion gases are caused to contact the restricted stream or jet at its opposite sides to promote mixing of the high temperature and lower temperature gases.

Apparatus implementing the method of the invention as above outlined preferably involves an illustrative vapor generating unit including a downwardly fired pulverized fuel burning furnace having its boundaries defined by vapor generating water tubes. These wall tubes are bent inwardly along opposite parts of the top of a primary furnace chamber to form inwardly extending arches which restrict the flow of the gases from the primary furnace chamber, and opposite rows of the pulverized coal burners project fuel and air streams downwardly and convergently into the primary furnace so as to set up upward flows of gases along the opposite burner walls and between the burners, with the opposite flows directed inwardly by the lower surfaces of the arches to the central restricted flow at the outlet of the primary furnace chamber. Beyond this outlet the wall tubes and the arches are bent so as to provide a widening throat leading to the main part of the secondary furnace therebeyond. On opposite sides of the central high velocity jet of combustion gases proceeding through the throat into the initial part of the secondary furnace chamber lower temperature combustion gases preferably derived from a point in the gas flow stream beyond the convection section, are introduced downwardly along the walls at opposite sides of the jet so as to promote quick mixing of the recirculated gases anud the unrecirculated gases and protect the wall tubes against excessive deposits of incombustible by crowding the unrecirculated gases into gas mixing regions at positions substantially removed from the wall tubes.

Such mixing of the recirculated and unrecirculated gases protects the vapor superheating tubes of the convection section against damage by gases of too high temperature and causes the mixing to take place in zones of minimum volumetric extent, thereby reducing the original cost of pertinent vapor generating and superheating units.

The invention will be concisely set forth in the claims, but for a complete understanding of the invention, its uses and advantages, recourse should be had to the following description which refers to a preferred embodiment of vapor generating and superheating unit illustrated in the drawings.

Figure 2:
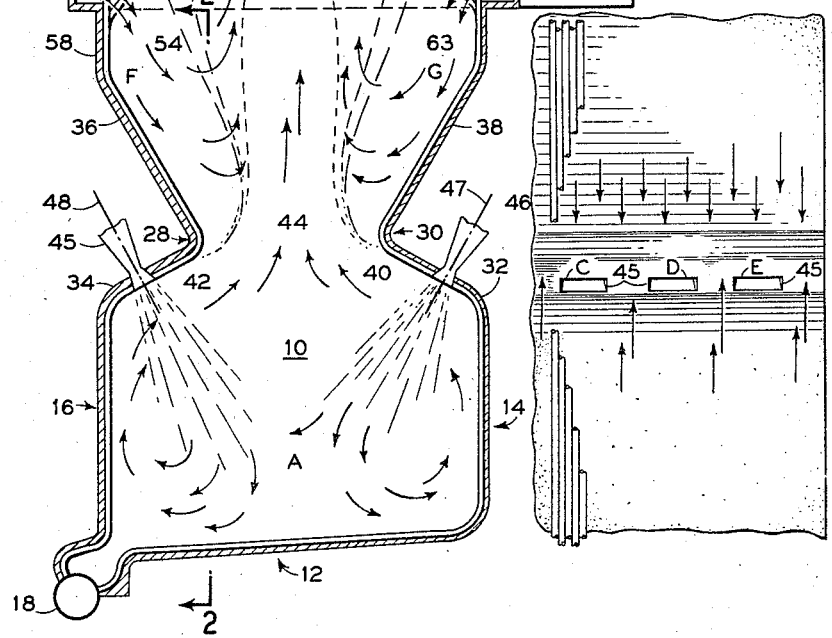

In the drawings:

Fig. 1 is a diagrammatic view in the nature of a side sectional elevation of a vapor generating and superheating unit in connection with which the invention is illustrated; and Fig. 2 is a partial vertical section on the line 2—2 of Fig. 1 showing the gas flow along walls of the unit adjacent the gas flow restricting arches between the high temperature combustion zone and the secondary heat exchange zone above the combustion zone.

The vapor or steam generating and superheating unit illustrated in the drawing utilizes the various features of the invention, and includes a high temperature combustion zone in a primary furnace chamber 10 having a floor 12 and front and rear walls 14 and 16 including vapor generating tubes leading upwardly from the lower header 18 and appropriately connected at their upper ends to a vapor or liquid drum 20. The liquid space of the drum may be directly connected to the header 18 by appropriate downcomers (not shown). The side walls of the primary furnace chamber 10, as well as the superposed secondary chamber 24 similarly include upright vapor generating tubes which may be appropriately connected by headers and other tubular connections to the header 18 and the drum 20. The general arrangement and construction of the vapor generating tubes of the walls of the furnace chambers may be constructed as illustrated by the U.S. patent to Bailey 2,293,040 of August 18, 1942.

In the zone between the primary furnace chamber 10 and the secondary furnace chamber 24, the upright tubes of the front and rear walls of these furnace chambers are bent inwardly to form the arches generally indicated at 28 and 30. The tubes of these arches along with appropriate inter-tube furnace wall closure means, form the lower and upwardly converging walls 32 and 34, and associated upwardly diverging walls 36 and 38. The arch nose 40, between the surfaces 32 and 38 and the opposite arch nose 42, between the surfaces 34 and 36 define a restricted gas flow zone 44 at the gas exit of the primary furnace chamber 10.

The primary furnace chamber 10 and the secondary furnace chamber 24 are preferably rectangular in cross section. At opposite sides of the primary furnace chamber 10 and along the inclined arch surfaces 32 and 34, are disposed rows of inter-tube pulverized fuel burners 45 and 47, the center lines of which are downwardly convergent as indicated at 46 and 48. These burners may be constructed and arranged in the manner illustrated by the U.S. patent to Bailey 2,068,205. The jets or streams of burning fuel from these different rows of burners impinge upon each other in the zone A, and the reaction of such impingement, along with the effect of the floor 12 of the primary furnace chamber causes the combustion products to diverge below the zone A and move toward the opposite walls 14 and 16. Thence, the combustion gases, with their suspended and fused particles of incombustible, pass upwardly along the walls 14 and 16 and between successive burners which are spaced as indicated at C, D and E in Fig. 2. The inclined arch walls 32 and 34 turn the upward gas flows inwardly toward the center of the restricted throat 44 between the arch noses 40 and 42, and the flow of gases continues in a high velocity jet 50, centrally of the secondary furnace chamber 24, forming a secondary heat exchange zone in which heat is transmitted radiantly from the products of combustion for the vaporization of the fluid in the wall tubes defining the chamber 24.

Thus, recirculation zones F and G are formed on opposite sides of the high velocity gas flow in the jet 50. The natural circulation tendency of these actions is utilized in the downward entry of recirculated lower temperature combustion gases into the zones F and G, as indicated by the arrows 63 and 54. Entry ports for the recirculated gases are provided by the bending of some of the tubes along the front and rear walls 56 and 58 of the secondary furnace chamber 24, inwardly as indicated at 60 and 62. Recirculated gases are conducted to these ports by appropriate ductwork 55 the outlets which are indicated at 64 and 66. This ductwork may have inlets communicating with combustion gas flow beyond the convection vapor superheater 70, and an appropriate fan 57, the ductwork 55, and a control damper 59 is provided for causing the pertinent flow of recirculated gases. There is a row of the recirculated gas ports along the front wall 58 and along the rear wall 56, this arrangement combining with the natural recirculation advantages of the unit to conduct the recirculated gases completely along the length of the wall portions 36 and 38.

The above indicated arrangement promotes effective mixing of the recirculated and unrecirculated gases in the recirculation zones F and G. It also keeps the wall slopes of the recirculating zones at reduced temperature thereby keeping the gas suspended and other slag particles in a relatively dry form, to facilitate their removal. The pertinent effect of the jet action through the throat 44 and the introduction of the recirculated gases to the recirculation zones F and G results in a relatively quick transformation of the suspended slag particles from a fluid or semi-fluid state to a relatively dry state, and the high velocity jet action tends to draw the tempering or recirculating gas into the high temperature gas within the jet and thus promote quick mixing of the gases. By use of this mixing method there is a minimum of wall surface exposed to slag at the transition temperature between this wet and dry state, and walls of the secondary chamber 24 are kept free of slag or ash accumulations.

The completion of the gas mixing action requires some distance, and, in view of this requirement, the convection surface beyond the secondary chamber 24 is disposed in a vertically extending plane. As an example of such surface, there are two rows 72 and 74 of upright tube sections preferably constituting extensions of the side wall tubes of the furnace wall 58. They are appropriately connected at their upper ends at the drum 20.

The primary furnace chamber 10 may constitute a slag tap furnace having an appropriate opening in its floor 12 for the removal of molten slag.

It is to be understood that the above described disclosure is indicative of large capacity central station steam generating and superheating units. Such a unit may have extensive reheater surface as well as superheater surface and the total of such surfaces may be more than one half of the total heat receiving surface of the unit. In the effective operation of such a unit, the use of the recirculated or tempering gases as described above minimizes the cost and volumetric requirements of the furnace chambers, as well as permits the combustion of fuel at such high temperatures that optimum combustion may be closely approached. The use of the slag tap furnace also minimizes the amount of heat absorbing surface ahead of the point of gas tempering, in a gas-flow sense.

The invention also introduces the tempering or recirculated gas at a point as near the primary furnace chamber as possible without causing the slag formations to obstruct gas flow and thereby render the mixing of the recirculated and unrecirculated gases ineffective.

Although the invention has been described with reference to the details of preferred embodiments, it is to be understood that the invention is not to be considered as limited to all of the details thereof. For example, it is within the purview of the invention that the vapor generating unit of the invention may not be rectangular in horizontal cross section, as particularly shown in the drawings. As to cross section, it might be multi-sided or circular. In the latter events, the arches separating the primary and secondary furnace chambers might form an arch, different portions of which would be diametrically opposite each other. Other and associated components of the unit would then have a circular arrangement instead of the arrangements only at two opposite portions of the unit.

What is claimed is:

1. In a high pressure vapor generating and superheating unit, means including vapor generating wall tubes defining a high temperature primary furnace chamber and a super-posed secondary furnace chamber; the tubes of opposite walls forming inwardly directed and oppositely arranged arches at the junction of the two furnace chambers; rows of downwardly convergent pulverized fuel burners disposed along the lower walls of the arches to convergently direct burning fuel streams into impinging relationship in a central and lower zone of the primary furnace chamber, a convection superheater subject to the gas flow from the secondary furnace chamber, the inwardly directed arches forming a restricted gas flow path outwardly of the primary furnace chamber and causing an upward high velocity jet action of the gases exiting from that chamber, the upper and outwardly diverging walls of the arches and the adjacent walls of the secondary furnace chamber forming natural recirculation zones at opposite sides of the high velocity jet, and a recirculated gas system including a fan and ductwork having inlets communicating with gas flow beyond the superheater and having downwardly directed outlet ports leading to the recirculation zones at opposite sides of the jet, said system also involving means at said ports directing the recirculating gases downwardly along the walls of the arches and into mixing relationship with the jet gases at a position near the maximum restriction of the gas flow path formed by the arches.

2. In a high pressure vapor generating and superheating unit, means including vapor generating wall tubes defining a high temperature primary furnace chamber and an adjacent and communicating secondary furnace chamber; convergently directed coal burners downwardly directing burning fuel streams into impinging relationship in a central zone of the primary furnace chamber remote from the secondary furnace chamber, a superheater subject to the gas flow from the secondary furnace chamber, means causing a restricted gas flow outward of the primary furnace chamber and causing a single high velocity jet action of all of the gases exiting from that chamber and entering the secondary furnace chamber, said means and the adjacent wall surfaces of the secondary furnace chamber forming recirculation zones at opposite sides of the high velocity jet, and a recirculated gas system including a fan and ductwork having an inlet communicating with gas flow beyond the superheater and having outlet ports communicating with the recirculation zones at opposite sides of the jet, said system also involving means at said ports directing the recirculated gases along the walls of secondary furnace chamber and into mixing relationship with the unrecirculated gases of the jet at a position near the maximum restriction of gas flow.

3. In a high pressure vapor generating and superheating unit, means including vapor generating wall tubes defining a high temperature primary furnace chamber and an adjacent superposed secondary furnace chamber; the tubes of opposite wall portions forming inwardly directed and oppositely arranged arch portions between the two furnace chambers; convergently directed pulverized fuel burners directing burning fuel streams into impinging relationship in a central zone of the primary furnace chamber, a vapor superheater subject to the heat of gases from the secondary furnace chamber, the inwardly directed arch formations forming a restricted gas flow outwardly of the primary furnace chamber and causing a single high velocity jet action of all of the gases exiting from that chamber, the outwardly diverging walls of the arches and the adjacent wall portions of the secondary furnace chamber forming recirculation zones at opposite sides of the high velocity jet, a recirculated gas system including a fan and ductwork having inlets communicating with gas flow beyond the superheater and having outlet ports communicating with the recirculation zone at opposite sides of the jet, and means associated with said ports arranged to direct the recirculated gases downwardly along the secondary furnace chamber diverging walls toward said arches and impinging on said exiting gas stream.

4. In a high pressure vapor generating and superheating unit, means including vapor generating wall tubes defining a high temperature primary furnace chamber and a superposed secondary furnace chamber communicating therewith; the tubes of opposite wall surfaces forming inwardly directed and oppositely arranged arch portions at the junction of the two furnace chambers; rows of downwardly convergent pulverized fuel burners disposed along the lower walls of the arches to convergently direct burning fuel streams into impinging relationship in a central and lower zone of the primary furnace chamber, a superheater subject to the heat of gases from the secondary furnace chamber, the inwardly directed arch portions forming a restricted gas flow path outwardly of the primary furnace chamber and causing an upward high velocity single jet action of all of the the gases exiting from that chamber, the upper and outwardly diverging walls of the arches and the adjacent surfaces of the secondary furnace chamber forming recirculation zones at opposite sides of the high velocity jet, and a recirculated gas system including a fan and ductwork having inlets communicating with gas flow beyond the superheater and having downwardly directed outlet ports leading to the recirculation zones at opposite sides of the jet, said recirculated gas system also involving means associated with the ports directing the recirculated gases downwardly along the walls of the arches bordering the recirculation zones.

5. The method of burning a slag-forming solid fuel in a fluid heating unit having a fluid cooled furnace chamber having converging roof portions defining a central restricted gas outlet in its upper end opening into a superposed fluid-cooled diverging gas radiation chamber which comprises introducing into the furnace chamber mixtures of particulate slag-forming fuel and combustion air from oppositely arranged points in the furnace chamber roof portions and burning the same under furnace chamber temperatures above the fuel ash fusion temperature while in downwardly converging streams impinging on one another adjacent the bottom of said furnace chamber and then sweeping across the furnace chamber floor in opposite directions before turning upwardly along the opposite sides of the furnace chamber, withdrawing slag separating from the burning fuel streams in a molten condition through the bottom of said furnace chamber, discharging the gaseous products of combustion in a high velocity upwardly directed jet stream through said central restricted gas outlet, and introducing relatively low temperature tempering gas into said gas radiation chamber in oppositely arranged streams directed downwardly along the fluid cooled diverging walls thereof towards opposite sides of said central restricted gas outlet and impinging on opposite sides of said jet stream.

6. The method of burning a slag-forming solid fuel in a fluid heating unit having a fluid cooled furnace chamber having converging roof portions defining a central restricted gas outlet in its upper end opening into a superposed fluid-cooled diverging gas radiation chamber which comprises introducing into the furnace chamber mixtures of particulate slag-forming fuel and combustion air from oppositely arranged points in the furnace chamber roof portions and burning the same under furnace chamber temperatures above the fuel ash fusion temperature while in downwardly converging streams impinging on one another adjacent the bottom of said furnace chamber and then sweeping across the furnace chamber floor in opposite directions before turning upwardly along the opposite sides of the furnace chamber, withdrawing slag separating from the burning fuel streams in a molten condition through the bottom of said furnace chamber, discharging the gaseous products of combustion in a high velocity upwardly directed jet stream through said central restricted gas outlet, passing the gaseous products of combustion over convection heat absorbing surface, and recirculating relatively low temperature gaseous products of combustion to said gas radiation chamber in oppositely arranged streams directed downwardly along the fluid cooled diverging walls thereof towards opposite sides of said central restricted gas outlet and impinging on opposite sides of said jet stream.

7. A fluid heating unit having walls forming a furnace chamber of substantially uniform rectangular horizontal cross-section substantially throughout its height and having a substantially horizontally arranged floor and converging roof portions defining a central restricted gas outlet in its upper end, vertically extending fluid heating tubes lining the walls and roof portions of said furnace chamber, walls forming a superposed upwardly diverging gas radiation chamber, means for introducing into the furnace chamber mixtures of particulate slag-forming fuel and combustion air from oppositely arranged points in the furnace chamber roof portions and burning the same under furnace chamber temperatures above the fuel ash fusion temperature while in pairs of downwardly converging streams impinging on one another closely adjacent said furnace chamber floor and a major portion of each stream then reversing to sweep across the furnace chamber floor in opposite directions before turning upwardly along the opposite sides of the furnace chamber, said means consisting of rows of oppositely arranged downwardly inclined fuel burners mounted and positioned substantially normal to the corresponding converging roof portions, means for withdrawing slag separating from the burning fuel streams in a molten condition through the floor of said furnace chamber, and said restricted gas outlet being proportioned to discharge the gaseous products of combustion in a high velocity upwardly directed jet stream therethrough.

8. A fluid heating unit having walls forming a furnace chamber having converging roof portions defining a central restricted gas outlet in its upper end, and a superposed upwardly diverging gas radiation chamber, means for introducing into the furnace chamber mixtures of particulate slag-forming fuel and combustion air from oppositely arranged points in the furnace chamber roof portions and burning the same under furnace chamber temperatures above the fuel ash fusion temperature while in downwardly converging streams impinging on one another adjacent the bottom of said furnace chamber and then sweeping across the furnace chamber bottom in opposite directions before turning upwardly along the opposite sides of the furnace chamber, means for withdrawing slag separating from the burning fuel streams in a molten condition through the bottom of said furnace chamber, said restricted gas outlet being proportioned to discharge the gaseous products of combustion in a high velocity upwardly directed jet stream therethrough, and means for introducing relatively low temperature tempering gas into said gas radiation chamber in oppositely arranged streams directed downwardly along the fluid cooled diverging walls thereof towards said central restricted gas outlet and impinging on opposite sides of said jet stream.

9. A fluid heating unit having walls forming a furnace chamber of uniform horizontal cross-section substantially throughout its height and having converging roof portions defining a central restricted gas outlet in its upper end, and a superposed upwardly diverging gas radiation chamber, fluid heating tubes lining the walls of said chambers, means for introducing into the furnace chamber mixtures of particulate slag-forming fuel and combustion air from oppositely arranged points in the furnace chamber roof portions and burning the same under furnace chamber temperatures above the fuel ash fusion temperature while in downwardly converging streams impinging on one another adjacent the bottom of said furnace chamber and then sweeping across the furnace chamber bottom in opposite directions before turning upwardly along the opposite sides of the furnace chamber, means for withdrawing slag separating from the burning fuel streams in a molten condition through the bottom of said furnace chamber, said restricted gas outlet being proportioned to discharge the gaseous products of combustion in a high velocity upwardly directed jet stream therethrough, and means for introducing relatively low temperature tempering gas into said gas radiation chamber in oppositely arranged streams directed downwardly along the fluid cooled diverging walls thereof towards said central restricted gas outlet and impinging on opposite sides of said jet stream.

References Cited in the file of this patent

UNITED STATES PATENTS

| 1,791,955 | Cannon | Feb. 10, 1931 |
| 1,866,404 | Frisch et al. | July 5, 1932 |

FOREIGN PATENTS

| 523,870 | Great Britain | July 24, 1940 |
| 675,410 | Great Britain | July 9, 1952 |
| 418,041 | Italy | Feb. 5, 1947 |
| 105,428 | Sweden | Sept. 8, 1942 |